United States Patent
Cole et al.

(10) Patent No.: US 7,194,195 B1
(45) Date of Patent: Mar. 20, 2007

(54) SOFTWARE BASED DIGITAL VIDEO RECORDER DEVICE

(75) Inventors: Terry L. Cole, Austin, TX (US); Charles R. Boswell, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1205 days.

(21) Appl. No.: 09/907,054

(22) Filed: Jul. 17, 2001

(51) Int. Cl.
  H04N 7/26 (2006.01)
  H04N 5/85 (2006.01)
  H04N 5/90 (2006.01)
  H04N 5/781 (2006.01)
  H04N 5/76 (2006.01)

(52) U.S. Cl. .................. 386/111; 386/125; 386/126
(58) Field of Classification Search .............. 386/45, 386/125, 126, 131, 95, 52
  See application file for complete search history.

(56) References Cited

U.S. PATENT DOCUMENTS

| | | | |
|---|---|---|---|
| 5,377,051 A * | 12/1994 | Lane et al. ................ | 386/81 |
| 5,502,600 A | 3/1996 | Bernardini ................ | 360/15 |
| 5,504,632 A | 4/1996 | Kita et al. ................ | 386/96 |
| 5,526,075 A | 6/1996 | Carlsen, II ................ | 352/26 |
| 5,819,004 A * | 10/1998 | Azadegan et al. ......... | 386/112 |
| 5,877,842 A | 3/1999 | Gibbens et al. ............ | 352/12 |
| 5,959,944 A | 9/1999 | Dockes et al. ............. | 369/30 |
| 5,974,004 A | 10/1999 | Dockes et al. ............. | 369/30 |
| 6,091,778 A * | 7/2000 | Sporer et al. ............. | 375/240 |
| 6,466,732 B1 * | 10/2002 | Kimura et al. ............. | 386/52 |
| 6,549,721 B1 * | 4/2003 | Ando et al. ............... | 386/95 |
| 6,760,574 B1 * | 7/2004 | Lu et al. .................. | 455/226.1 |
| 2002/0037153 A1 * | 3/2002 | Slone ....................... | 386/52 |

* cited by examiner

*Primary Examiner*—Thai Q. Tran
*Assistant Examiner*—Gelek Topgyal
(74) *Attorney, Agent, or Firm*—Robert A. Voigt, Jr.; Winstead Sechrest & Minick, P.C.

(57) ABSTRACT

A system and method for converting information stored on a magnetic medium to DVD format. A tape transport mechanism may sample information stored on a magnetic medium at a selected rate where the selected rate is correlated to an available buffer size in a data processing system. The rate at which information is sampled may be less than the NTSC standard of 30 frames/second thereby requiring less storage to store the digital video representation. The sampled information may be captured and converted into a digital format. The digitized magnetic waveform may be transferred to the data processing system configured to convert the digitized magnetic signals into digitized television waveforms to recover the analog and video content. The digitized television waveforms may then be converted into a digital video representation. The digitized information may then be temporarily stored in the available buffer prior to being compressed and converted into DVD format.

6 Claims, 3 Drawing Sheets

SOFTWARE BASED DIGITAL VIDEO RECORDER DEVICE

TECHNICAL FIELD

The present invention relates to the field of recording mediums, and more particularly to converting information stored on a magnetic recording medium, e.g., videotape, to DVD format.

BACKGROUND INFORMATION

Video and audio may be recorded on a variety of mediums including a videotape. A videotape is a magnetic tape used for recording full-animation video images. The most widely used videotape format is the one half inch wide VHS cassette that is commonly used in a Video Cassette Recorder (VCR). A VCR is a videotape recording and playback mechanism common in many households.

A problem with recording information, e.g., video, audio, on a videotape is that a videotape has a half-life of approximately ten years. That is, one half of all videotapes deteriorate at a point of not being usable in approximately ten years as a result of demagnetization, overuse, age, etc. Subsequently, information, e.g., video, audio, including special memories, e.g., high school graduation, recorded on a videotape may eventually be lost.

A recording medium that will eventually supersede videotapes is commonly referred to as Digital Versatile Disc (DVD). A DVD is an optical disc that has the same overall dimensions of a Compact Disc (CD) but with significantly higher storage capacities. DVDs have the advantage over videotapes of not degrading from repeated use or age. Therefore, it is desirable to convert information stored on a magnetic tape, e.g., videotape, that may eventually be lost to a DVD format.

Currently information on a magnetic tape, e.g., videotape, may be stored on a DVD by playing the videotape in a high quality VCR. The output of the VCR is in a standard TV format, e.g., National TV Standards Committee (NTSC), Phase Alternating Line (PAL). The TV signals may then be transferred to a device, e.g., digital video camcorder, that may be configured to convert the TV signals into a digital video representation. The digital information may then be transferred to a computer via a high speed bus, e.g., FireWire, Peripheral Component Interconnect (PCI) bus. The digital information must then be stored on a disk, e.g., hard drive, prior to compressing and converting the digital information to a DVD format by software, e.g., DVD encoder software, as the software, e.g., DVD encoder software, cannot compress and convert the digital information in real-time. Since the software, e.g., DVD encoder software, cannot compress and convert the digital information in real-time, a significant amount of digital information must be stored in memory, e.g., hard drive, thereby resulting in a storage problem. For example, converting a single VHS tape (2 hour tape) to DVD format using the above process may require a storage capacity of 200 gigabytes which exceeds the storage capacity of most personal computer hard drives.

It would therefore be desirable to develop a process of converting magnetic information stored on a magnetic medium, e.g., videotape, to DVD format requiring less storage capacity. It would further be desirable to eliminate hardware in the process of converting magnetic information stored on a magnetic medium, e.g., videotape, to DVD format.

SUMMARY

The problems outlined above may at least in part be solved in some embodiments by a tape transport and capture mechanism sampling the information on the magnetic medium, e.g., videotape, at a rate less than the National TV Standards Committee (NTSC) standard of 30 frames/second thereby requiring less storage capacity than in the prior art to store the digital video representation of the information on the magnetic medium prior to compressing and converting the digital information into a Digital Versatile Disc (DVD) format.

In one embodiment, a method for converting information on a magnetic medium to DVD format comprises the step of a tape transport mechanism sampling the information stored on a magnetic medium, e.g., videotape, at a selected rate where the selected rate is correlated to a size of an available buffer used to store the digital video representation of the information stored on the magnetic medium. That is, the selected rate matches a size of an available buffer used to store the digital video representation of the information stored on the magnetic medium. By sampling at a rate less than the NTSC standard of 30 frames/second, less storage capacity may be required to store the digital video representation of the information on the magnetic medium as in the prior art. The sampled information may then be captured by the tape transport mechanism. Upon capturing the sampled information, the captured information may be converted into a digital format and transferred to a data processing system. The data processing system may be configured to convert the digitized magnetic signals into digitized television waveforms to recover the analog and video content of the information stored on the magnetic medium, e.g., videotape. The digitized television waveforms may then be converted into a digital video representation, e.g., CIF, MPEG, HDTV. Once the information on the magnetic medium, e.g., videotape, has been converted into a digital video representation, the digitized information may then be temporarily stored in the available buffer prior to being compressed and converted into DVD format.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a system and method for converting information stored on a magnetic medium to a DVD format. In one embodiment of the present invention, a tape transport mechanism may sample information stored on a magnetic medium, e.g., videotape, at a selected rate where the selected rate is correlated to a size of an available buffer in a data processing system configured to store the digital video representation of the information on the magnetic medium. That is, the selected rate matches a size of an available buffer used to store the digitized video representation of the information on the magnetic medium. The rate at which information is sampled may be less than the NTSC standard of 30 frames/second thereby requiring less storage to store the digital video representation of the information on the magnetic medium. The sampled information may then be captured and converted into a digital format. The digitized magnetic waveform may be transferred to the data processing system configured to convert the digitized magnetic signals into digitized television waveforms to recover the analog and video content of the information stored on the magnetic medium. The digitized television waveforms may then be converted into a digital video representation. The digital video representation of the information on the magnetic medium may then be temporarily stored in the available buffer prior to being compressed and converted into DVD format.

FIG. 1—System

Figure 1:
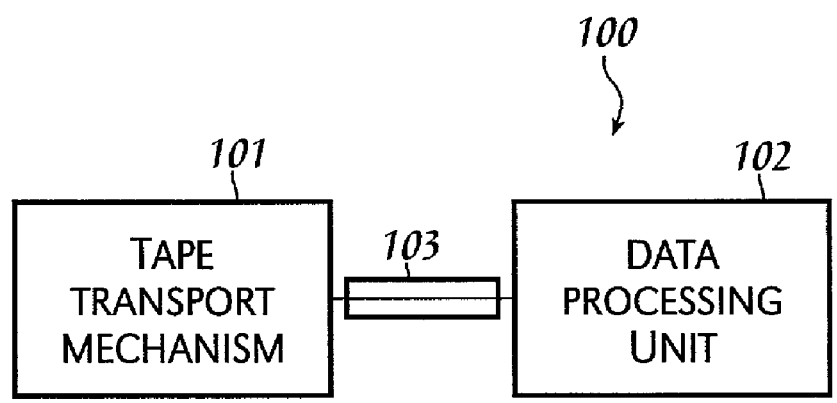
FIG. 1 illustrates an embodiment of the present invention of a system for converting information stored on a magnetic medium to DVD format.

FIG. 1 illustrates an embodiment of the present invention of a system 100 for converting information stored on a magnetic medium, e.g., videotape, to DVD format. Referring to FIG. 1, system 100 may comprise a tape transport and capture mechanism 101 operating under servo control coupled to a data processing unit 102 through a medium 103, e.g., serial data bus, wireless. A more detailed description of tape transport and capture mechanism 101 is provided in the description of FIG. 2. A more detailed description of data processing unit 102 is provided in the description of FIG. 3.

Figure 2:
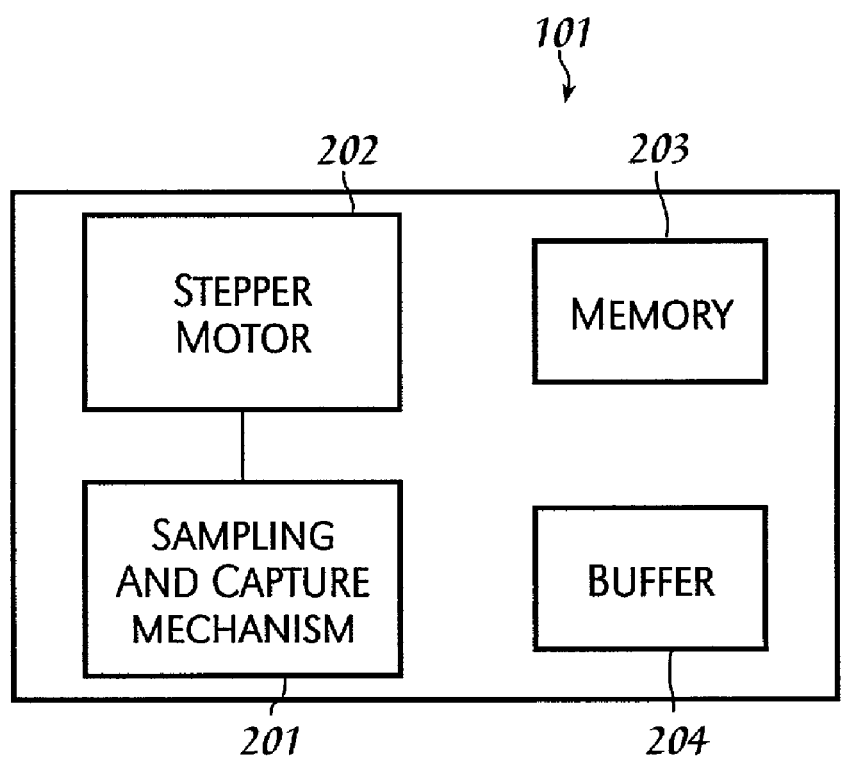
FIG. 2 illustrates a tape and transport mechanism configured in accordance with the present invention.

FIG. 2—Tape Transport and Capture Mechanism

FIG. 2 illustrates an embodiment of tape transport and capture mechanism 101 configured in accordance with the present invention. Tape transport and capture mechanism 101 may comprise a sampling and capture mechanism 201 configured to sample a magnetic medium, e.g., videotape. Sampling and capture mechanism 201 may further be configured to capture the sampled magnetic information. Tape transport and capture mechanism may further comprise a stepper motor 202 configured to covert the magnetic signal on the magnetic medium, e.g., videotape, into a voltage or current signal which subsequently is transferred to sampling and capture mechanism 201. Furthermore, stepper motor 202 may be configured to control the sampling rate of sampling and capture mechanism 201 such that the sampling rate is less than the National TV Standards Committee (NTSC) standard of 60 fields/second, i.e., 30 frames/second. In prior art, the tape transport and capture mechanism produced television signals at the NTSC standard of 30 frames/second which thereby resulted in an excessive storage capacity to store the digital video representation of the information on the magnetic medium. By sampling the magnetic medium at a rate less than the NTSC standard of 30 frames/second, less storage capacity may be required to store the digitized video representation of the information on the magnetic medium as explained in the detailed description of FIG. 3. In one embodiment, stepper motor 202 may control the sampling rate of sampling and capture mechanism 201 by controlling the movement of the magnetic medium, e.g., videotape, from one spindle (not shown) to another (not shown) by receiving pulses of Direct Current (DC) at a particular rate determined by software stored in a memory 203.

Tape transport and capture mechanism 101 may further comprise memory 203 storing a program configured to convert the captured magnetic information into digitized magnetic signals. The digitized magnetic waveforms may then be transferred to data processing unit 102 through medium 103, e.g., serial data bus, wireless. Since sampling and capture mechanism 201 samples the magnetic medium, e.g., videotape, at a rate less than the NTSC standard of 30 frames/second, tape transport and capture mechanism 101 transfers the digitized magnetic waveforms to data processing unit 102 at a rate less than the NTSC standard of 30 frames/second.

In one embodiment, tape transport and capture mechanism 101 may further comprise a buffer 204 configured to temporarily store the digitized magnetic signals prior to transferring the digitized magnetic signals to data processing unit 102. For example, buffer 204 in tape transport and capture mechanism 101 may temporarily store the digitized magnetic signals when medium 103 is a shared bus, e.g., Universal Serial Bus (USB).

Figure 3:
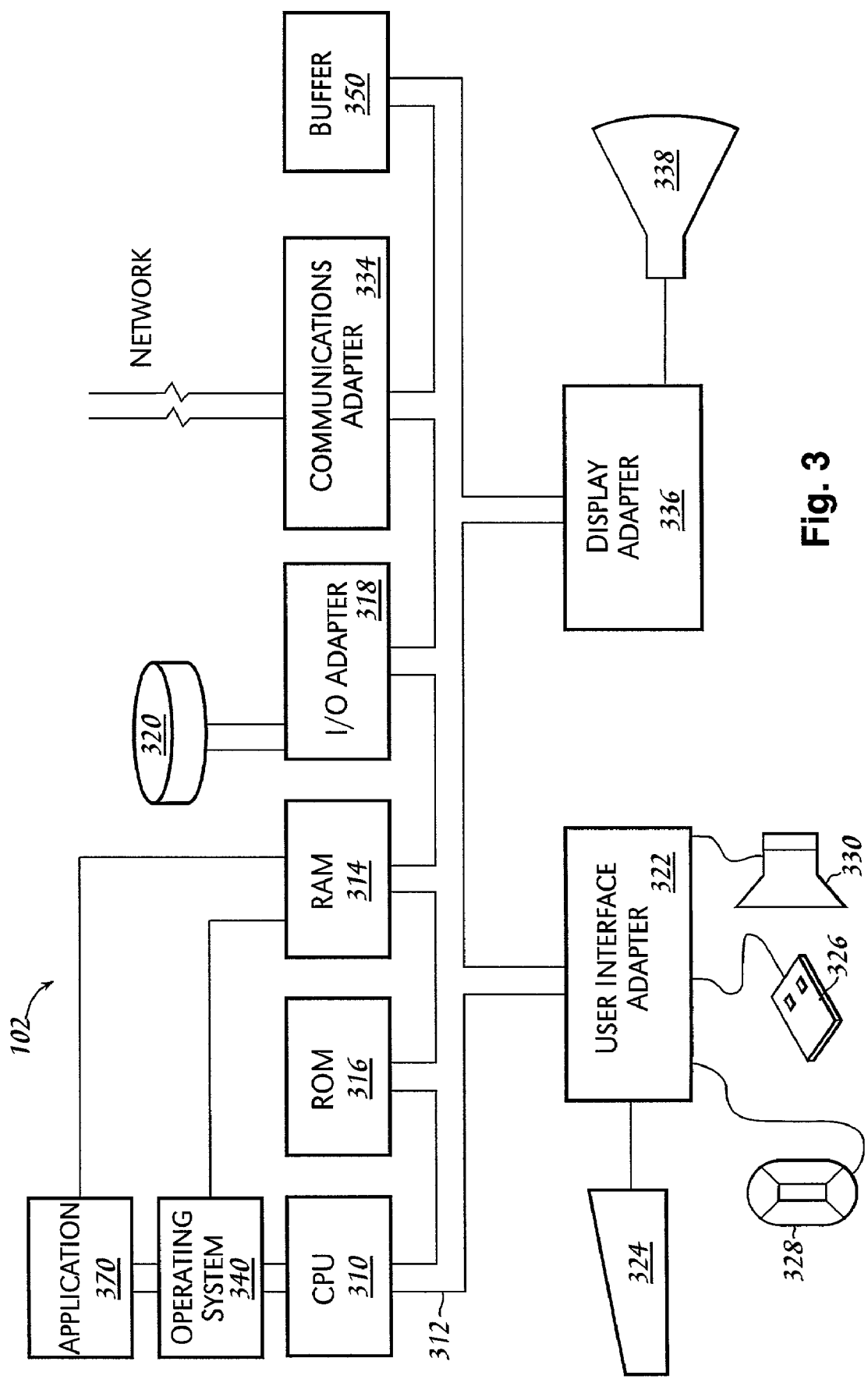
FIG. 3 illustrates a data processing system configured in accordance with the present invention.

FIG. 3—Computer System

FIG. 3 illustrates an embodiment of the present invention of data processing system 102. Referring to FIG. 3, data processing unit 102 may be configured to process the received digitized magnetic waveform to recover the analog and video content in a digitized television format, e.g., NTSC, PAL. Data processing unit 102 may further be configured to convert the digitized television waveforms into a digital video representation, e.g., Common Intermediate Format (CIF), Moving Pictures Experts Group (MPEG), High Definition TV (HDTV). It is noted that the steps of converting the digitized magnetic signals into a digital video representation may be performed by data processing unit 102 using software instead of hardware, e.g., digital video capture card, as in prior art. For example, a program for converting the digitized magnetic signals into a digital video representation may reside in a disk unit 320 or in an application 370. Once the digitized magnetic waveforms have been converted into a digital video representation, the digital video representation may be temporarily stored in a buffer 350 where the size of buffer 350 is dictated by the rate sampling and capture mechanism 201 (FIG. 2) samples the magnetic medium, e.g., videotape. That is, the lower the rate sampling and control mechanism 201 samples the magnetic medium, e.g., videotape, the smaller the size of buffer 350. As stated above, sampling and capture mechanism 201 may be configured to sample the magnetic medium, e.g., videotape, at a rate such that tape transport and control mechanism 101 produces digitized magnetic signals at a rate less than the NTSC standard of 30 frames/second. By producing digitized magnetic signals at a rate less than the NTSC standard of 30 frames/second, the size of buffer 350 may be less than in the prior art.

Upon storing the digital video representation in buffer 350, encoding software, e.g., DVD encoding software, may be implemented to compress and convert the digital video representation into DVD format. In one embodiment, the encoding software, e.g., DVD encoding software, may reside in disk unit 320. In another embodiment, the encoding software, e.g., DVD encoding software, may reside in application 370. It is noted that since the encoding software, e.g., DVD encoding software, cannot compress and convert the digital video representation in real-time, buffer 350 may be required to temporarily store the digital video representation.

Referring to FIG. 3, data processing system 102 may further comprise a central processing unit (CPU) 310 coupled to various other components by system bus 312. An operating system 340 runs on CPU 310 and provides control and coordinates the function of the various components of FIG. 3. Application 370, e.g., program for converting the digitized magnetic waveforms into a digital video representation, runs in conjunction with operating system 340 which implements the various functions to be performed by application 370. Read only memory (ROM) 316 is coupled to system bus 312 and includes a basic input/output system ("BIOS") that controls certain basic functions of data processing system 102. Random access memory (RAM) 314, I/O adapter 318, communications adapter 334 and buffer 350 are also coupled to system bus 312. It should be noted that software components including operating system 340 and application 370 are loaded into RAM 314 which is the computer system's main memory. I/O adapter 318 may be a small computer system interface ("SCSI") adapter that communicates with disk unit 320, e.g., disk drive. It is noted that the program for converting the digitized magnetic waveforms into a digital video representation may reside in disk unit 320 or in application 370. It is further noted that the encoding software, e.g., DVD encoder software, may reside in disk unit 320 or in application 370. Communications adapter 334 interconnects bus 312 with an outside network enabling data processing system 102 to communicate with other such systems. As stated above, buffer 350 may provide temporary storage for the digitized video representation of the information on the magnetic medium prior to being compressed and converted into DVD format. In one embodiment, buffer 350 may be a segment of system's memory, i.e., RAM 314. In another embodiment, buffer 350 may be a segment of disk unit 320. Input/Output devices are also connected to system bus 312 via a user interface adapter 322 and a display adapter 336. Keyboard 324, trackball 328, mouse 326 and speaker 330 are all interconnected to bus 312 through user interface adapter 322. Event data may be input to data processing system 102 through any of these devices. A display monitor 338 is connected to system bus 312 by display adapter 336. In this manner, a user is capable of inputting to system 102 through keyboard 324, trackball 328 or mouse 326 and receiving output from system 102 via display 338 or speaker 330.

Implementations of the invention include implementations as a computer system programmed to execute the method or methods described herein, and as a computer program product. According to the computer system implementations, sets of instructions for executing the method or methods are resident in the random access memory 314 of one or more computer systems configured generally as described above. Until required by the computer system, the set of instructions may be stored as a computer program product in another computer memory, for example, in disk drive 320 (which may include a removable memory such as an optical disk or floppy disk for eventual use in disk drive 320). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 4:
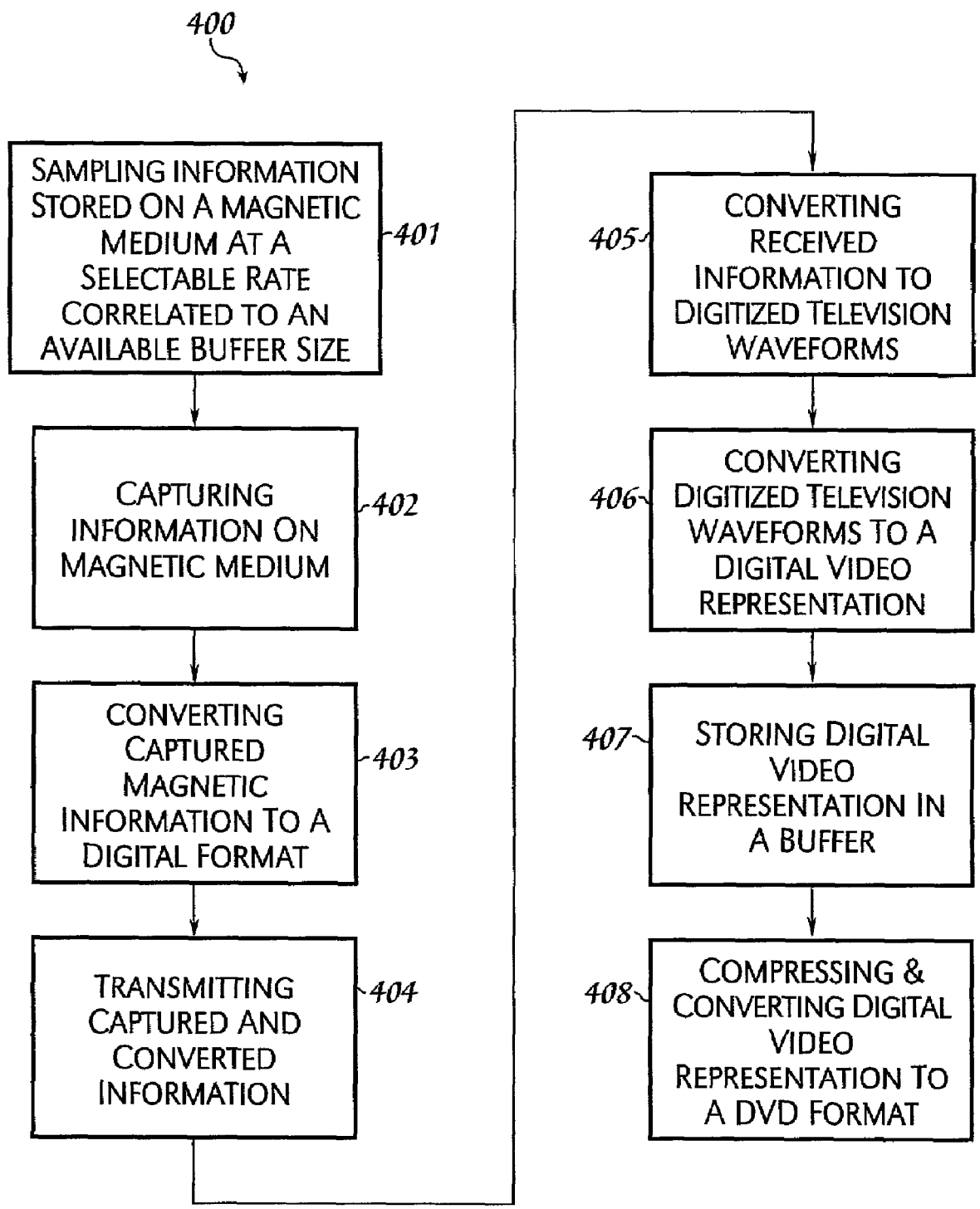
FIG. 4 is a flowchart of a method for converting information stored on a magnetic medium to DVD format.

FIG. 4—Method for Converting Information in a Magnetic Medium to DVD Format

FIG. 4 illustrates one embodiment of the present invention of a method 400 for converting information in a magnetic medium, e.g., videotape, to Digital Video Disc (DVD) format. As stated in the Background Information section, the current process of converting information stored on a magnetic medium, e.g., videotape, to DVD format requires a significant amount of storage capacity. For example, converting a single VHS tape to DVD format using the process as stated in the Background Information section may require a storage capacity of about 200 gigabytes which exceeds the storage capacity of most personal computer hard drives. It would therefore be desirable to develop a process of converting magnetic information stored on a magnetic medium, e.g., videotape, to DVD format requiring less storage capacity. It would further be desirable to eliminate hardware in the process of converting magnetic information stored on a magnetic medium, e.g., videotape, to DVD format. Method 400 is a method for converting magnetic information stored on a magnetic medium, e.g., videotape, to DVD format requiring less storage capacity. Furthermore, method 400 is a method for converting magnetic information stored on a magnetic medium, e.g., videotape, to DVD format requiring less hardware.

In step 401, tape transport and capture mechanism 101 operating under servo control may be configured to sample the information on a magnetic medium, e.g., videotape, at a selectable rate where the selectable rate is correlated to an available size of buffer 350. That is, the selected rate matches an available size of buffer 350. Tape transport and capture mechanism 101 may comprise sampling and capture mechanism 201 configured to sample the information on the magnetic medium, e.g., videotape, at a rate that allows tape transport and capture mechanism 101 to produce digitized magnetic signals at a rate less than the NTSC standard of 60 fields/second, i.e., 30 frames/second. In one embodiment, the sampling rate of the information on the magnetic medium, e.g., videotape, may be controlled by stepper motor 202 in tape transport and capture mechanism 101. In one embodiment, stepper motor 202 may control the sampling rate of sampling and capture mechanism 201 by controlling the movement of the magnetic medium, e.g., videotape, from one spindle to another by receiving pulses of Direct Current (DC) at a particular rate determined by software stored in memory 203 in tape transport and capture mechanism 101.

In step 402, the sampled information may be captured by tape transport and capture mechanism 101. The rate at which the sampled information is captured may be less than the NTSC standard of 30 frames/second as a result of the rate the information on the magnetic medium, e.g., videotape, is sampled in step 401. As stated above, in the prior art, the rate at which tape transport and capture mechanism 101 samples signals from the magnetic medium, e.g., videotape, is at the NTSC standard of 30 frames/second which thereby resulted in an excessive storage capacity to store the digitized video representation. By capturing sampled signals at a rate less than the NTSC standard of 30 frames/second, less storage capacity may be required to store the digitized video representation of the information on the magnetic medium.

In step 403, the captured sampled information may be converted to a digital format. In step 404, the information, i.e., digitized magnetic signals, captured and converted by tape transport and capture mechanism 101 may be transferred at a rate less than the NTSC standard of 60 fields/second to data processing system 102. It is noted that the information, i.e., digitized magnetic signals, may be transferred to data processing system 102 through any type of medium, e.g., high speed serial bus, wireless, by tape transport and capture mechanism 101. It is noted that in one embodiment, tape transport and capture mechanism 101 may comprise buffer 204 configured to temporarily store the digitized magnetic signals prior to transferring the digitized magnetic signals to data processing system 102 in step 404.

In step 405, the digitized magnetic information received by data processing unit 102 may be converted to digitized television waveforms to recover the analog and video content of the information stored on the magnetic medium, e.g., videotape. In step 406, the digitized television waveforms may be converted into a digital video representation, e.g., CIF, MPEG, HDTV. In step 407, the digital video representation, e.g., CIF, MPEG, HDTV, may be stored in a buffer 350 whose size is correlated with the rate tape transport and capture mechanism 101 samples the information on the magnetic medium, e.g., videotape, in step 401. That is, the lower the rate tape transport and capture mechanism 101 samples the magnetic medium, e.g., videotape, the smaller the size of buffer 350. It is noted that the steps of converting the digitized magnetic signals into a digital video representation, i.e., steps 405 and 406, may be performed by data processing unit 102 using software instead of hardware, e.g., digital video capture card, as in prior art.

In step 408, the digital video representation of the information on the magnetic medium may be compressed and converted to DVD format by encoder software, e.g., DVD encoder software, residing in application 370. In one embodiment, the encoder software, e.g., DVD encoder software, may reside in disk unit 320. It is noted that since the encoder software cannot compress and convert the digital information in real-time, buffer 350 may be required to temporarily store the digital video representation.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A system, comprising:
a tape transport and capture mechanism comprising:
circuitry for sampling information stored on a magnetic medium at a selected rate, wherein said selected rate is correlated to a size of an available first buffer;
circuitry for capturing said sampled information; and
a first memory unit operable for storing a computer program operable for converting said captured information into a digitized waveform; and
a data processing unit coupled to said tape transport mechanism, wherein said data processing unit comprises circuitry for receiving said digitized waveform, wherein said data processing unit further comprises:
a processor;
a second memory unit operable for storing a computer program operable for performing the following programming steps:
converting said digitized waveform into a digital video representation;
storing said digital video representation in said available first buffer size;
compressing said digital video representation; and
converting said digital video representation into said DVD format;
said available first buffer configured to store said digital video representation;
an input mechanism;
an output mechanism; and
a bus system coupling the processor to the buffer, input mechanism, output mechanism, and the second memory unit.

2. The system as recited in claim 1, wherein said tape transport mechanism operates under servo control.

3. The system as recited in claim 2, wherein said selected sample rate of said magnetic information is controlled by a stepper motor.

4. The system as recited in claim 1, wherein said tape transport and capture mechanism further comprises a second buffer configured to temporarily store said digitized waveform prior to transferring said digitized waveform to said data processing unit.

5. The system as recited in claim 1, wherein said digitized waveform is converted into a digitized television waveform which is converted into said digital video representation.

6. The system as recited in claim 1, wherein said selected rate is less than 30 frames/second.

* * * * *